Jan. 27, 1970   V. SUNNER   3,491,724
ANIMAL WEANING DISHES
Filed May 5, 1967

INVENTOR
Virginia Sunner

3,491,724
ANIMAL WEANING DISHES
Virginia Sunner, 873 Fredericka Drive,
Bethel Park, Pa. 15102
Filed May 5, 1967, Ser. No. 636,443
Int. Cl. A01k 5/00
U.S. Cl. 119—61                          1 Claim

ABSTRACT OF THE DISCLOSURE

An animal weaning dish having an annular U-shaped trough with a central upstanding member acting as a guide for an animal's face and mouth into the food in the trough and discouraging walking or stepping into the food.

---

This invention relates to animal weaning dishes and particularly to a weaning dish for puppies and like animals.

The problems which are encountered by animal breeders in weaning young animals are generally well known. The problem of weaning puppies is typical of the problems of weaning animals of this type and will be used as an example throughout this specification. It is generally necessary for the person raising puppies to wean each puppy by hand. This is a very tedious chore particularly if the person has a large number of puppies that must be weaned at the same time. When the puppies are left to teach themselves to feed out of an ordinary feeding dish, they destroy more food than they consume by walking through it, by spilling it and by their general struggles in an effort to find the best way to reach the food and to consume it. I have invented a dish which eliminates these problems and at the same time makes it possible to maintain a degree of warmth in the food comparable to that to which the puppy is accustomed.

In a preferred form of my invention I provide an annular trough having an outer raised edge, a base supporting said trough, a central upstanding member within the annulus of the trough extending upwardly above the plane of the outer edge of the trough. Preferably, the member within the annulus is hollow and may receive a heating means such as hot water or a chemical reacting material which maintains the temperature of the food in the dish or trough at a temperature approximately that to which he has been accustomed. Preferably the weaning dish is made of stainless steel, although it may be of ceramic ware or some other suitable material.

In the foregoing general description I have set out certain objects, purposes and advantages of my invention. Other objects, purposes and advantages may become apparent from a consideration of the following description and the accompanying drawings in which.

Figure 1:
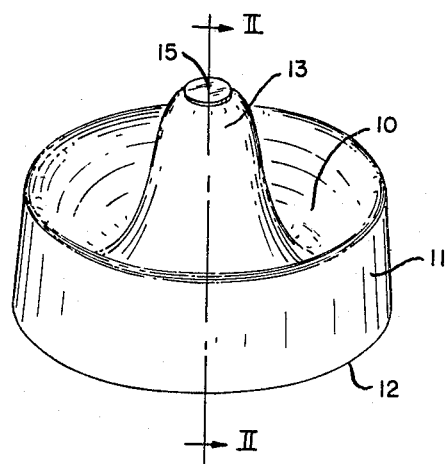
FIGURE 1 is an isometric view of a weaning dish according to my invention.
Figure 2:
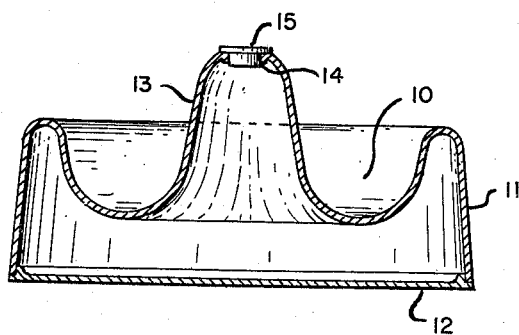
FIGURE 2 is a section on the line II—II of FIGURE 1.

Referring to the drawings, I have illustrated an annular U-shaped trough 10 having a depending edge 11 attached to a base 12. An upstanding generally frusto-conical member 13 is attached to the annulus of the annular trough to form a central portion higher than the portions of the trough 10. Food for the puppy is placed in the trough-like member 10 which is of such shape and size that the young puppy is guided into the trough by the nature of the central member 13 and the annulus, thus preventing his aimless efforts to reach the food and generally discouraging him from walking into the food dish. Warm water, to maintain the food at the temperature of the food to which he has been accustomed, may be inserted into the interior of the dish through the opening 14 at the top of the member 13 by removing cap 15. It is obvious that other heating means may be provided by inserting them into the interior of the hollow member.

It will be obvious from the foregoing description that the weaning dish, which is relatively simple and inexpensive to make, will discourage misuse of food and will keep the food in better condition for eating. It will also be obvious that while I have illustrated and described a presently preferred embodiment of my invention, the invention may take other forms and embodiments.

I claim:

1. A weaning dish for puppies and like animals comprising an annular U-shaped trough, a depending flange on the outer peripheral edges of such trough and a central upstanding frusto-conical member in the annulus of said member extending above the outer periphery of the trough, said frusto-conical member and trough forming a smooth curved surface free of obstructions open to guide a puppy's nose to the trough, a bottom sealingly attached to said depending flange to form a liquid tight container and an access opening in the central frusto-conical member for receiving a temperature stabilizing means into the interior of the dish.

References Cited

UNITED STATES PATENTS

| D. 156,331 | 12/1949 | French  | D30—16 |
| D. 201,670 | 7/1965  | Moore   | D30—16 |
| 2,259,682  | 10/1941 | Collins | 119—61 |
| 2,322,665  | 6/1943  | Ryan    | 220—13 |
| 2,592,638  | 4/1952  | Andrew  | 119—61 |
| 2,928,372  | 3/1960  | Farley  | 119—61 |
| 2,928,567  | 3/1960  | Davis   | 220—13 |
| 3,205,609  | 9/1965  | Moore   | 119—61 X |

ALDRICH F. MEDBERY, Primary Examiner

UNITED STATES PATENT OFFICE
CERTIFICATE OF CORRECTION

Patent No. 3,491,724 January 27, 1970

Virginia Sunner

It is certified that error appears in the above identified patent and that said Letters Patent are hereby corrected as shown below:

Column 2, line 54, "3,205,609" should read -- 3,205,860 --

Signed and sealed this 17th day of November 1970.

(SEAL)
Attest:

Edward M. Fletcher, Jr.
Attesting Officer

WILLIAM E. SCHUYLER, JI
Commissioner of Patents